(No Model.) 2 Sheets—Sheet 1.
L. R. FAUGHT.
BORING BAR.
No. 253,523. Patented Feb. 14, 1882.
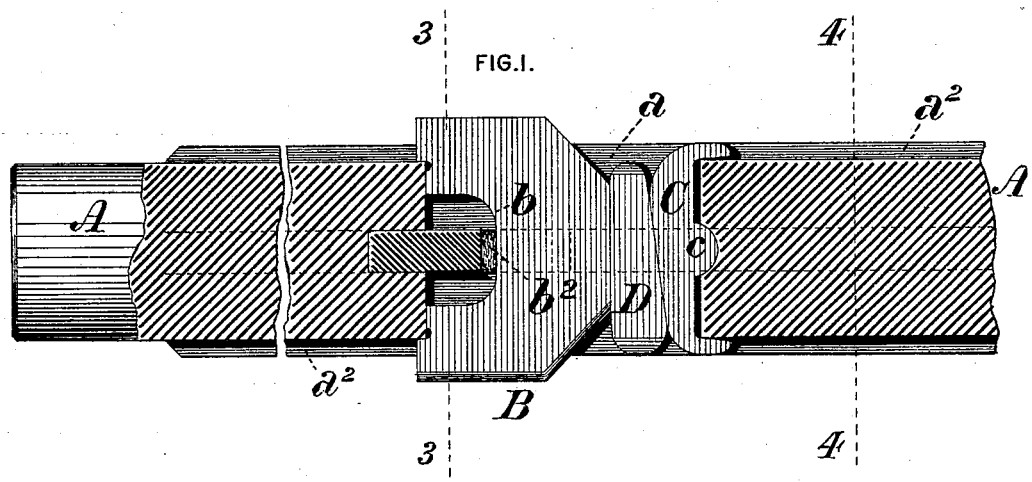
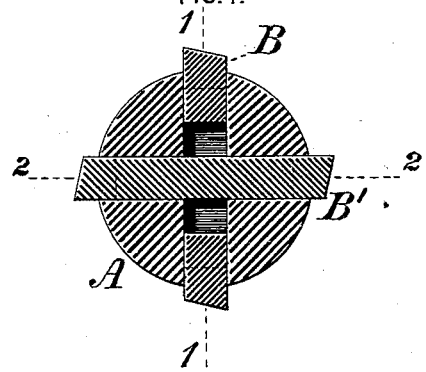
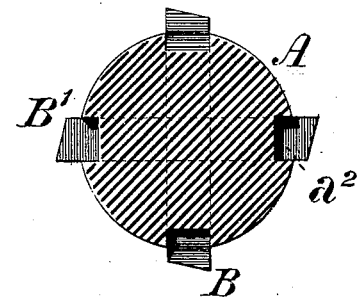
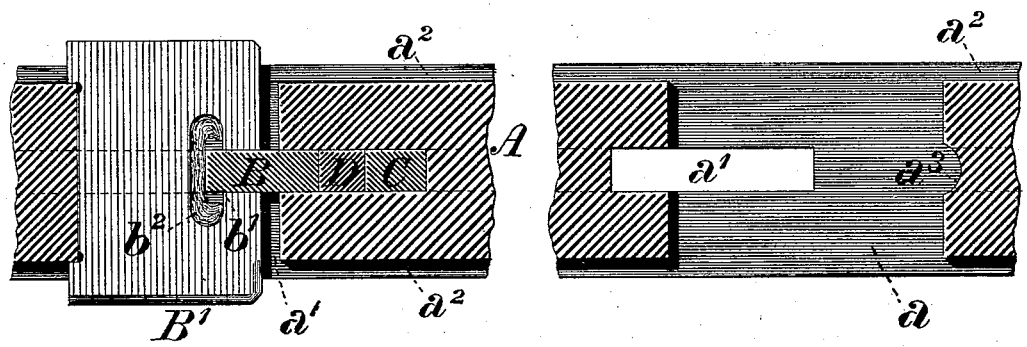
WITNESSES:
Geo. B. Collier
Geo. T. Kelly
INVENTOR
L. R. Faught,
by Collier & Bell
Attys.

(No Model.) 2 Sheets—Sheet 2.

L. R. FAUGHT.
BORING BAR.

No. 253,523. Patented Feb. 14, 1882.

WITNESSES:
Geo. B. Collier
Geo. T. Kelly

INVENTOR
L. R. Faught,
by Collier & Bell
attys.

UNITED STATES PATENT OFFICE.

LUTHER R. FAUGHT, OF PHILADELPHIA, PENNSYLVANIA.

BORING-BAR.

SPECIFICATION forming part of Letters Patent No. 253,523, dated February 14, 1882.

Application filed September 15, 1881. (No model.)

*To all whom it may concern:*

Be it known that I, LUTHER R. FAUGHT, of the city and county of Philadelphia, in the State of Pennsylvania, have invented certain new and useful Improvements in Boring-Bars, of which improvements the following is a specification.

The object of my invention is to afford such improved facilities for adjusting and securing one or a pair of cutters in a boring-bar either adjacent to one of its ends or in desired intermediate position as will obviate deflection or straining of the bar and enable the cutters to be readily inserted and removed and securely held; also, to admit of the convenient application and use of a facing cutter or cutters in any desired position longitudinally upon a boring-bar, thereby enabling the same to be employed without removal for facing surfaces at right angles to its bored work.

To these ends my improvements consist in certain novel devices and combinations, as hereinafter fully set forth.

Figure 6:
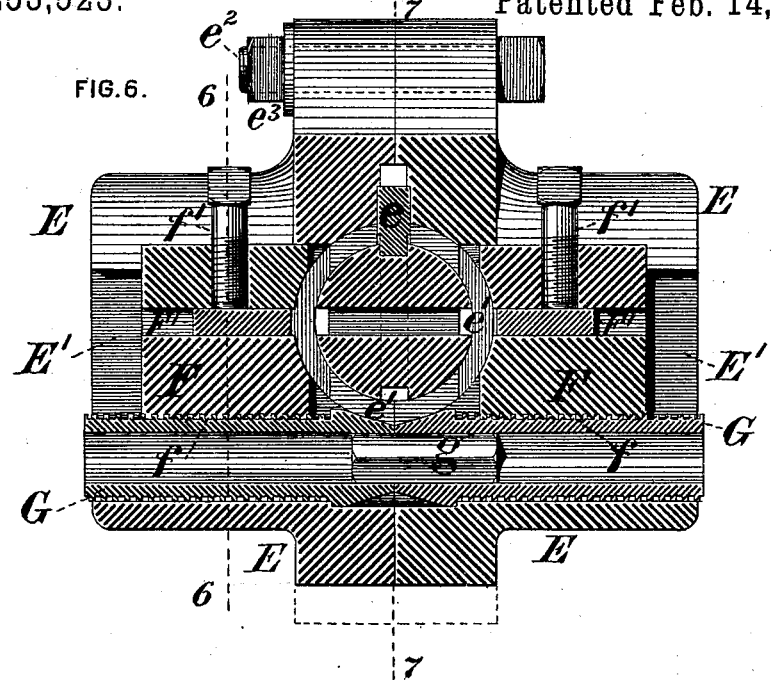
Figures 7, 8:
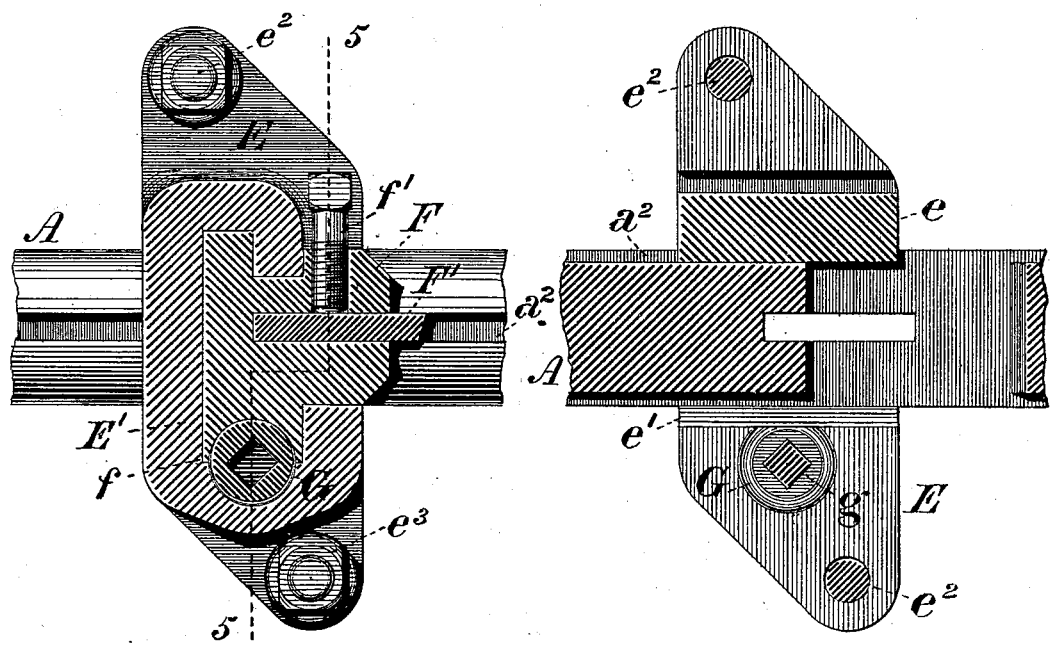

In the accompanying drawings, Figure 1 is a longitudinal central section at the line 1 1 of Fig. 4 through a portion of a boring-bar having cutters and accessories embodying my invention; Fig. 2, a similar section at the line 2 2 of Fig. 4; Fig. 3, a section at the line 1 1 of Fig. 4, with the cutters removed; Figs. 4 and 5, transverse sections at the lines 3 3 and 4 4, respectively, of Fig. 1; Fig. 6, an irregular section through the boring-bar and the facing-cutter head at the line 5 5 of Fig. 7; Fig. 7, a section through the cutter-head at the line 6 6 of Fig. 6, and Fig. 8 a section through the cutter-head and the boring-bar at the line 7 7 of Fig. 6.

Boring-bars as ordinarily constructed are of two classes. In one of these the bar projects from a spindle, and is confined therein with sufficient rigidity to perform its duty without the employment of a support exterior to the cutters, which are located adjacent to the extreme end of the bar, and are usually adjusted and secured by a set-screw passing longitudinally through the end of the bar and clamping the cutter against the farther side of the slot in which it is fitted. In the other class one end of the bar is connected to the spindle by which it is rotated by being socketed therein, and the opposite end is supported in a bearing or by a common center. In such case the bars are of considerably greater length than those of the former class, the difference in length being necessitated by the different character of the work to be performed by the cutters.

My improvements are applicable to boring-bars of each of the before-named descriptions, but are more particularly designed for and desirable in the latter class. The defect which has heretofore obtained in the operation of a cutter or cutters located at or near the central portion of a long boring-bar has been that the means ordinarily adopted for securing the cutters in position tend to exert unequal strain upon the sections of the bar at opposite ends of the cutters, the effect of which is to deflect that portion of the bar upon which the cutters are secured from a true central alignment with its bearings, thereby causing the edges of the several cutters to be rotated at different distances, respectively, from the axial line of the bar, instead of, as should be the case, at a uniform distance therefrom. It is further desirable, in order to adapt the boring-bar to as wide a range of work as possible, that the end surfaces of the cutter-slots should be maintained truly parallel and perpendicular to the axial line of the bar, which desideratum is not fully provided in the ordinary construction, in which the methods of adjustment tend to break down the bearing-shoulders.

My improvements are designed to obviate the objections before recited as well as to comply as fully as may be with all practical requirements of the service of boring and facing, for which they render the bar adaptable.

The boring-bar A has, in common with those known and used prior to my invention, a series of transverse or diametric slots, $a\ a'$, arranged in pairs and at right angles one to the other, at desired intervals in the length of the bar. One of the slots of each pair is in line and communicates with two of a series of four longitudinal grooves or recesses, $a^2$, formed in the bar A, from one of its end bearings to the other, and the other slot of each pair is similarly located relatively to the other two grooves. The slots $a\ a'$ serve for the reception at any desired point of the two boring-tools or cutters B B', which present four cutting-edges, spaced equally about the axis of the boring-bar, the location and object of the cutting-surfaces being similar in principle to those shown in Letters Patent of the United States No. 241,481, granted and issued to me under date of May 17, 1881, the mode of securing the cutters in position differing therefrom, as presently to be described.

Referring to Figs. 1 to 5, the cutter B, which is fitted in the slot $a$, is adjusted and secured in position therein by a gib, C, having a central segmental bearing-face, $c$, which enters a correspondingly-formed recess, $a^3$, in the center of the slot $a$ at the end thereof opposite that against which the cutter B has its bearing. The opposite face of the gib C is beveled or inclined in correspondence with the adjacent face of a clamping-key, D, interposed between the gib and cutter, the thrust of which key, when driven to the requisite tightness, being exerted at one side upon the central recessed bearing, $a^3$, in the bar and at the other upon the cutter B. By this construction lateral strain or deflection of the bar is avoided, and the segmental form of the gib-bearing surface and its recess permits any inequality that may exist in the fitting of the cutter to its bearing on the opposite end of the slot to be accurately compensated for. When, as is preferably the case, two cutters are employed, the cutter B has a recess, $b$, formed in its face for the admission of the cutter B', which is fitted in the slot $a'$, and is firmly clamped therein by the pressure of the cutter B upon a pad or cushion, $b^2$, of leather, rubber, or other yielding or elastic material, which is inserted in a recess, $b'$, in the cutter B', and transmits the thrust of the clamping-key D as applied to it through the cutter B to the cutter B' in the axial line of the boring-bar A. Said cushion serves further to enable an accurate alignment and adjustment to be made between the clamping-cutter B, the cutter B', and the bearing of the latter upon the end of the slot $a'$, so that the cutter B' will be firmly secured in its position without the necessity of securing such accurate fitting and correspondence of the parts as would otherwise be indispensable, and which in practice it is found extremely difficult to obtain or to maintain in operation. It will of course be obvious that the devices before described are applicable to any of the several pairs of slots in the bar.

To enable the boring-bar A to be employed without removal from its bearings in facing work, I provide the facing cutter-head shown in Figs. 6 to 8, which, as will be seen, is adjustable to and removable from the bar at any desired point in its length. The facing cutter-head is composed of two blocks or carrier-section, E E, the meeting surfaces of which are planed off truly and recessed semicircularly at center, so that the sections may be fitted around the boring-bar A and clamped thereon by bolts $e^2$ passing through lugs on the sections and nuts $e^3$. A key, $e$, fitting in a corresponding recess in the sections and entering one of the longitudinal grooves $a^2$ of the boring-bar, insures the coincident rotation of the cutter head and bar. The cutter-head is adapted for use upon bars of different diameters, a segmental sleeve or bushing formed of liners or filling-pieces $e'$ of proper thickness being interposed between the sections and the bar when the radius of the latter is less than that of the central semicircular recesses in the sections.

A tool-holder, F, in which a facing tool or cutter, F', is secured by a set-screw, $f'$, is fitted neatly in a slide, E', in each of the sections E, so as to be movable therein radially to the boring-bar A, and a semicircular female screw or half-nut, $f$, is formed upon one side of each of the tool-holders parallel to it line of movement, the lead of the threads of the screws being in opposite directions, respectively—that is to say, one being a right-hand and the other a left-hand screw. A screw, G, the lead of whose thread corresponds with that of the thread of the adjacent tool-holder, is fitted in each of the sections E, so as to be rotated freely therein and to engage the thread of the tool-holder, which, by the rotation of the screw in one or the other direction, will be moved in its guide toward or from the axis of the boring-bar. The inner ends of the screws G meet in the plane of the axis of the boring-bar, and outward movement of the screws is prevented by collars, which are formed upon them at the inner extremities of their threads and which bear against correspondingly-located shoulders in the sections E. A central opening of polygonal section is formed in each of the screws, in which opening a corresponding block, $g$, is inserted, so as to cause the screws to be simultaneously rotated by the application of a key of proper form to the central opening of either, such rotation causing the cutters to be fed outwardly or inwardly, in accordance with the direction of the rotation.

The cutter-head can be readily and securely attached to and removed from the boring-bar at any desired point, and may be likewise reversed in position, so as to cut either from the right or the left side, as required.

I claim as my invention and desire to secure by Letters Patent—

1. The combination, substantially as set forth, of a transversely-slotted boring-bar, a tool or cutter fitting in the slot of the bar and bearing against one end of said slot, a gib having a segmental face bearing centrally against the opposite end of the slot, and a clamping-key interposed between the cutter and gib.

2. The combination, substantially as set forth, of a boring-bar having one or more pairs of transverse slots, the slots of each pair being at right angles one to the other, a cutter fitting in one of said slots, a cutter fitting in the corresponding slot at right angles thereto and held in position by a clamping-key, and a yielding or elastic pad or cushion interposed centrally between the two cutters and transmitting the thrust of the clamping-key to the cutter first specified.

3. The combination, substantially as set forth, of a longitudinally-grooved and transversely-slotted boring-bar, a removable sectional cutter-head secured upon said bar, and one or more facing-cutters secured in said cutter-head.

4. The combination, substantially as set forth, of two blocks or sections adapted to be clamped together upon a boring-bar, two tool-holders, each fitted in a slide in one of the blocks and carrying a facing-cutter, and two feed-screws of respectively reversed lead, each mounted in one of the blocks and engaging a female screw on the tool-holder therein.

5. The combination, substantially as set forth, of a longitudinally-grooved boring-bar, a two-part facing cutter-head, two clamping-bolts uniting the sections of the head, and a key fitting in the groove of the bar and in a recess of the head.

6. Jointly with a sectional cutter-head, a segmental sleeve or bushing fitting within the recesses of the sections on each side of a key fitting between said sections, substantially as and for the purpose set forth.

L. R. FAUGHT.

Witnesses:
J. SNOWDEN BELL,
GEO. T. KELLY.